United States Patent
Yoshikawa et al.

(10) Patent No.: US 12,363,424 B2
(45) Date of Patent: Jul. 15, 2025

(54) DISPLACEMENT DETECTION METHOD, IMAGE-CAPTURING INSTRUCTION METHOD, DISPLACEMENT DETECTION DEVICE, AND IMAGE-CAPTURING INSTRUCTION DEVICE

(71) Applicant: Panasonic Intellectual Property Management Co., Ltd., Osaka (JP)

(72) Inventors: Satoshi Yoshikawa, Hyogo (JP); Toshiyasu Sugio, Osaka (JP); Toru Matsunobu, Osaka (JP); Masaki Fukuda, Osaka (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/413,807

(22) Filed: Jan. 16, 2024

(65) Prior Publication Data
US 2024/0155224 A1 May 9, 2024

Related U.S. Application Data

(60) Division of application No. 17/462,630, filed on Aug. 31, 2021, now Pat. No. 11,956,532, which is a
(Continued)

(51) Int. Cl.
*H04N 23/63* (2023.01)
*G06F 3/048* (2013.01)
(Continued)

(52) U.S. Cl.
CPC ......... *H04N 23/64* (2023.01); *G06F 3/04842* (2013.01); *G06T 7/344* (2017.01);
(Continued)

(58) Field of Classification Search
CPC . G06T 2207/10028; G06T 2207/10032; G06T 2207/10044; G06T 2207/20021;
(Continued)

(56) References Cited

U.S. PATENT DOCUMENTS

| | | | |
|---|---|---|---|
| 7,668,406 B2 * | 2/2010 | Schnee | G06V 10/12 |
| | | | 235/462.01 |
| 9,876,993 B2 * | 1/2018 | Sablak | H04N 7/183 |

(Continued)

FOREIGN PATENT DOCUMENTS

| | | |
|---|---|---|
| EP | 2 911 090 | 8/2015 |
| JP | 2002-328021 | 11/2002 |

(Continued)

OTHER PUBLICATIONS

International Search Report (ISR) issued on May 26, 2020 in International (PCT) Application No PCT/JP2020/006393.
(Continued)

*Primary Examiner* — Wesner Sajous
(74) *Attorney, Agent, or Firm* — Wenderoth, Lind & Ponack, L.L.P.

(57) ABSTRACT

A displacement detection method, performed by a computer, includes: obtaining (i) a first three-dimensional (3D) model representing a region at a first timing by 3D points and including first objects and (ii) a second three-dimensional model representing the region at a second timing by 3D points and including second objects, the second timing being different from the first timing; detecting, by use of attribute information of the first objects and the second objects, (i) first 3D points included in the first 3D model and (ii) second 3D points included in the second 3D model and associated with the respective first 3D points; performing alignment of the first 3D model and the second 3D model by use of the first 3D points and the second 3D points; and detecting
(Continued)

displacement between the first 3D model and the second 3D model after the alignment.

6 Claims, 14 Drawing Sheets

Related U.S. Application Data continuation of application No. PCT/JP2020/006393, filed on Feb. 19, 2020.

(60) Provisional application No. 62/814,046, filed on Mar. 5, 2019.

(51) Int. Cl.
| | |
|---|---|
| *G06F 3/04842* | (2022.01) |
| *G06T 7/33* | (2017.01) |
| *G06T 19/20* | (2011.01) |
| *H04N 13/10* | (2018.01) |
| *H04N 13/25* | (2018.01) |
| *H04N 23/23* | (2023.01) |
| *H04N 23/60* | (2023.01) |

(52) U.S. Cl.
CPC ........... *G06T 19/20* (2013.01); *H04N 23/631* (2023.01); *H04N 23/633* (2023.01); *G06T 2219/2004* (2013.01)

(58) Field of Classification Search
CPC . G06T 2207/20224; G06T 2207/30184; G06T 1/20; G06T 7/344; G06T 17/00; G06T 19/20; G01B 11/24; G06F 3/04842; G06F 3/048; G06V 10/12; H04N 23/64; H04N 23/633; H04N 23/631; H04N 23/61–62; H04N 23/695; H04N 23/611; H04N 7/183; H04N 5/57; G06K 7/10752; G06K 7/10732; G06K 2207/1018
See application file for complete search history.

(56) References Cited

U.S. PATENT DOCUMENTS

| | | | | |
|---|---|---|---|---|
| 10,848,731 | B2* | 11/2020 | Simek | H04N 13/106 |
| 11,677,920 | B2* | 6/2023 | Simek | H04N 23/45 |
| | | | | 348/46 |
| 2003/0098352 | A1* | 5/2003 | Schnee | G06K 7/10752 |
| | | | | 235/472.01 |
| 2004/0100563 | A1* | 5/2004 | Sablak | H04N 23/611 |
| | | | | 348/E7.087 |
| 2010/0318929 | A1* | 12/2010 | Hilton | G06F 3/0482 |
| | | | | 715/848 |
| 2017/0270386 | A1* | 9/2017 | Trouve | G06V 20/653 |
| 2019/0174109 | A1 | 6/2019 | Yoshikawa et al. | |
| 2019/0191146 | A1 | 6/2019 | Koyama et al. | |
| 2019/0258225 | A1* | 8/2019 | Link | G06T 7/70 |
| 2021/0333979 | A1* | 10/2021 | Rockel | G06F 3/04845 |
| 2023/0269353 | A1* | 8/2023 | Simek | H04N 13/254 |
| | | | | 348/46 |

FOREIGN PATENT DOCUMENTS

| | | | |
|---|---|---|---|
| JP | 2005-114744 | 4/2005 | |
| JP | 2017-84004 | 5/2017 | |
| JP | 2017-227608 | 12/2017 | |
| JP | 22018-129682 | 8/2018 | |
| JP | 2018129682 A * | 8/2018 | ............ H04N 5/232 |
| JP | 2019-118136 | 7/2019 | |
| WO | 2018/030206 | 2/2018 | |
| WO | 2018/043225 | 3/2018 | |

OTHER PUBLICATIONS

Extended European Search Report issued Apr. 4, 2022 in corresponding European Patent Application No. 20766301.4.

* cited by examiner

Recommended image-capturing direction

DISPLACEMENT DETECTION METHOD, IMAGE-CAPTURING INSTRUCTION METHOD, DISPLACEMENT DETECTION DEVICE, AND IMAGE-CAPTURING INSTRUCTION DEVICE

CROSS REFERENCE TO RELATED APPLICATIONS

This is a divisional of U.S. application Ser. No. 17/462,630, filed Aug. 31, 2021, which is a continuation application of PCT International Application No. PCT/JP2020/006393 filed on Feb. 19, 2020, designating the United States of America, which is based on and claims priority of U.S. Provisional Patent Application No. 62/814,046 filed on Mar. 5, 2019. The entire disclosures of the above-identified applications, including the specifications, drawings and claims are incorporated herein by reference in their entirety.

FIELD

The present disclosure relates to a displacement detection method, an image-capturing instruction method, a displacement detection device, and an image-capturing instruction device.

BACKGROUND

A three-dimensional map, etc., can be more simply generated by generating a three-dimensional model by use of an image captured by a camera, compared to a case of laser measurement. The aforementioned method is used for, for example, survey at construction sites. Moreover, the use of the three-dimensional model generation by use of the camera image makes it possible to manage the progress of a varying subject at a construction site or the like.

Patent Literature (PTL) 1 discloses a method for obtaining the amount of damage at the time of disaster occurrence based on a difference between three-dimensional models before and after the disaster.

CITATION LIST

Patent Literature

PATENT LITERATURE

Japanese Unexamined Patent Application Publication No. 2002-328021

SUMMARY

A displacement detection method according to one aspect of the present disclosure is a displacement detection method performed by a computer and includes: obtaining a first three-dimensional (3D) model and a second three-dimensional (3D) model, the first 3D model representing a region at a first timing by 3D points, the second 3D model representing the region at a second timing by 3D points, the second timing being different from the first timing, the first 3D model including first objects, the second 3D model including second objects; detecting, by use of attribute information of the first objects and the second objects, (i) first 3D points included in the first 3D model and (ii) second 3D points included in the second 3D model and associated with the respective first 3D points; performing alignment of the first 3D model and the second 3D model by use of the first 3D points and the second 3D points; and detecting displacement between the first 3D model and the second 3D model after the alignment.

An image-capturing instruction method according to another aspect of the present disclosure instructs capturing of an image used for generating a three-dimensional model, and includes: specifying a region of the three-dimensional model generated where points are sparse; and instructing a user to capture an image in the region specified.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
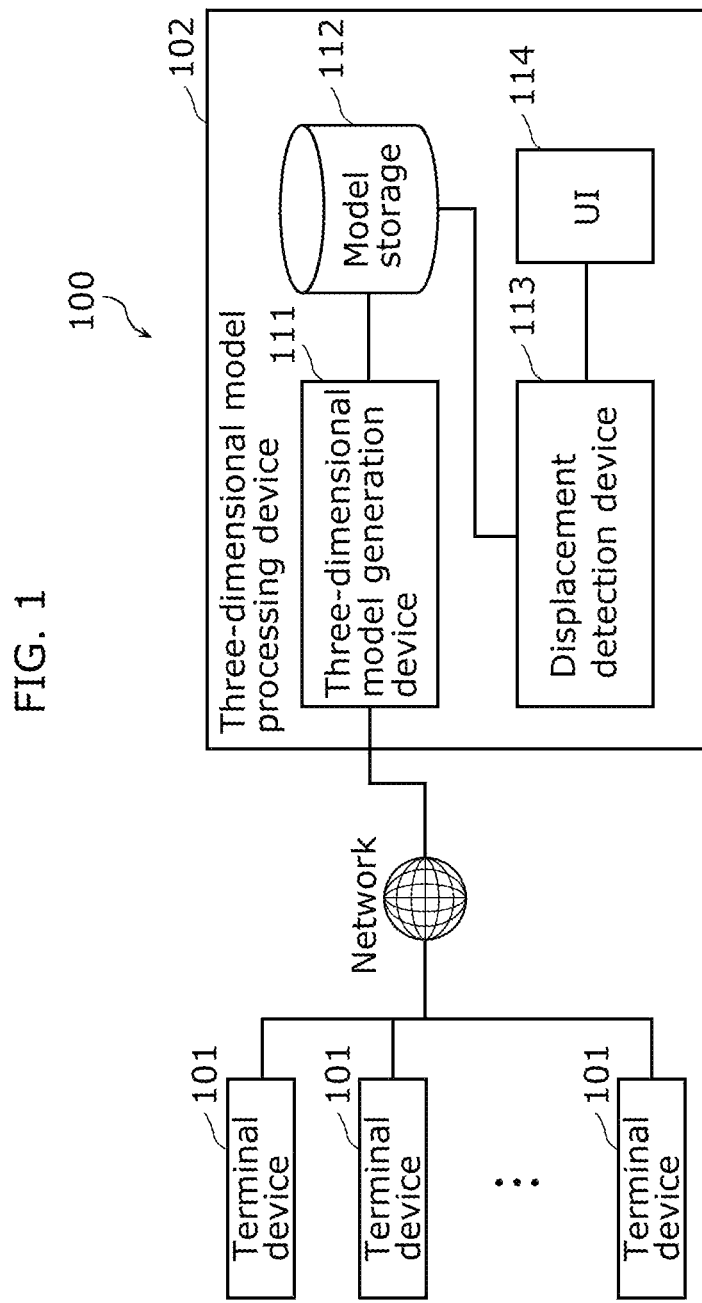
FIG. 1 is a diagram illustrating a configuration of a three-dimensional model processing system according to the present embodiment.

A displacement detection method according to one aspect of the present disclosure is a displacement detection method for detecting displacement between a first three-dimensional model and a second three-dimensional model of the same region and obtained at mutually different times. The displacement detection method includes: detecting corresponding points included in the first three-dimensional model and the second three-dimensional model by use of attribute information of a first objects included in the first three-dimensional model and a second objects included in the second three-dimensional model; performing alignment between the first three-dimensional model and the second three-dimensional model by use of the corresponding points detected; and detecting displacement between the first three-dimensional model and the second three-dimensional model after the alignment.

With the aforementioned configuration, the displacement detection method can improve the displacement detection accuracy by detecting the corresponding points by use of the attribute information.

For example, the detecting of the corresponding points may include detecting the corresponding points by preferentially using an artificial object included in the first objects and the second objects based on the attribute information.

With the aforementioned configuration, the displacement detection method can improve the alignment accuracy by performing alignment by use of corresponding points included in an artificial object with less timekeeping changes than a natural object. Therefore, the displacement detection method can improve the displacement detection accuracy.

For example, the detecting of the corresponding points may include: selecting a first selected object from among the first objects based on a user operation; selecting, from among the second objects, a second selected object having same attribute information as attribute information of the first selected object; and detecting the corresponding points by use of the first selected object and the second selected object.

With the aforementioned configuration, the displacement detection method can improve the corresponding point detection accuracy by detecting the corresponding points from the objects having the same attribute information. Therefore, the displacement detection method can improve the alignment accuracy and can improve the displacement detection accuracy.

For example, the selecting of the second selected object may include: displaying a user interface for a user to select the second selected object from among the second objects; and selecting the second selected object from among the second objects based on a user operation via the user interface, and among the second objects, only a second object having the same attribute information as the attribute information of the first selected object may be selectable on the user interface.

With the aforementioned configuration, the displacement detection method can improve the accuracy in the corresponding point detection performed by the user. Therefore, the displacement detection method can improve the alignment accuracy and can improve the displacement detection accuracy.

For example, the selecting of the second selected object may include: displaying a user interface for a user to select the second selected object from among the second objects; selecting the second selected object from among the second objects based on a user operation via the user interface; and emphasizing, among the second objects, a second object having same attribute information as the attribute information of the first selected object more than a second object having attribute information different from the attribute information of the first selected object on the user interface.

With the aforementioned configuration, the displacement detection method can improve the accuracy in the corresponding point detection performed by the user. Therefore, the displacement detection method can improve the alignment accuracy and can improve the displacement detection accuracy.

An image-capturing instruction method according to one aspect of the present disclosure refers to an image-capturing instruction method for instructing the capturing of an image used for generating a three-dimensional model, and includes: specifying a region of the three-dimensional model generated where points are sparse; and instructing the user to capture an image in the region specified.

With the aforementioned configuration, the image-capturing instruction method can improve the accuracy of the three-dimensional model by use of the captured image. Therefore, the image-capturing instruction method can improve the displacement detection accuracy.

For example, the instruction may include instructing the user with a route where the image in the region specified is captured.

With the aforementioned configuration, for example, the image-capturing instruction method can collectively instruct the capturing of still images or moving images used for generating the three-dimensional model.

For example, the instructing may include displaying the route on a bird's-eye view of the three-dimensional model.

With the aforementioned configuration, the image-capturing instruction method can appropriately instruct the user.

For example, the instruction may include displaying an image-capturing direction at an image-capturing point in the route on the bird's-eye view.

With the aforementioned configuration, the image-capturing instruction method can appropriately instruct the user.

A displacement detection device according to one aspect of the present disclosure refers to a displacement detection device which detects displacement between a first three-dimensional model and a second three-dimensional model of the same region and obtained at different times, and includes a processor; and a memory, in which the processor, by use of the memory: detects corresponding points included in the first three-dimensional model and the second three-dimensional model by use of attribute information of a first objects included in the first three-dimensional model and a second objects included in the second three-dimensional model; performs alignment between the first three-dimensional model and the second three-dimensional model by use of the corresponding points detected; and detects displacement between the first three-dimensional model and the second three-dimensional model after the alignment.

With the aforementioned configuration, the displacement detection device can detect the corresponding points by use of the attribute information to thereby improve the displacement detection accuracy.

An image-capturing instruction device according to one aspect of the present disclosure refers to an image-capturing instruction device which instructs the capturing of an image used for generating a three-dimensional model, and includes a processor; and a memory, in which the processor, by use of the memory: specifies a region of the three-dimensional model generated where points are sparse; and instructs a user to capture an image in the region specified.

With the aforementioned configuration, the image-capturing instruction device can improve the accuracy of the three-dimensional model by use of the image captured. Therefore, the image-capturing instruction device can improve the displacement detection accuracy.

Hereinafter, an embodiment will be described in detail with reference to the drawings. Note that each embodiment described below illustrates one detailed example of the present disclosure. Numerical values, shapes, materials, components, arrangement positions and connection modes of the components, steps, a sequence of the steps, etc., illustrated in the embodiment below each form one example and are not intended to limit the present disclosure in any manner. Moreover, of the components in the embodiment described below, those not described in an independent claim will be described as optional components.

EMBODIMENT

First, a configuration of a three-dimensional model processing system according to the present embodiment will be described. FIG. 1 is a diagram illustrating the configuration of three-dimensional model processing system 100 according to the present embodiment. Three-dimensional model processing system 100 includes a plurality of terminal devices 101 and three-dimensional model processing device 102.

Terminal device 101 has the function of capturing an image (still image or moving image). Terminal device 101 also has at least one of a transmission function of transmitting a captured image to three-dimensional model processing device 102 and a display function of displaying UI information outputted from three-dimensional model processing device 102. Three-dimensional model processing device 102 includes three-dimensional model generation device 111, model storage 112, displacement detection device 113, and UI 114.

Three-dimensional model generation device 111 acquires, from one or more terminal devices 101, the images captured by terminal devices 101, and generates a three-dimensional model (for example, point cloud data) through image processing using the acquired images. More specifically, three-dimensional model generation device 111 uses an image group at given time to generate a three-dimensional model at the aforementioned time. Moreover, three-dimensional model generation device 111 generates a plurality of three-dimensional models at mutually different times by use of a plurality of image groups at the mutually different times. Moreover, three-dimensional model generation device 111 saves the generated plurality of three-dimensional models into model storage 112.

Note that when there are a plurality of terminal devices 101, simultaneous image-capturing may be realized by use of time stamp of each device. With the aforementioned configuration, a three-dimensional model can be generated for each time even when a subject captured commonly with each of terminal devices 101 is moving.

Displacement detection device 113 acquires two or more three-dimensional models from model storage 112 and then compares the three-dimensional models with each other to thereby detect displacement (a change) between the three-dimensional models. Displacement detection device 113 passes results of the displacement detection to UI 114.

Model storage 112 saves the plurality of three-dimensional models generated by three-dimensional model generation device 111 and provides the stored three-dimensional models to displacement detection device 113 in response to a request from displacement detection device 113. Note that model storage 112 may archive the three-dimensional models on the web via the Internet and acquire the archived three-dimensional models from the web.

Moreover, the plurality of three-dimensional models stored in model storage 112 do not have to be the three-dimensional models generated by three-dimensional model generation device 111 and may include a three-dimensional model generated from, for example, data obtained through laser survey such as light detection and ranging (LiDAR).

UI 114 visualizes a displacement portion on the three-dimensional model detected by displacement detection device 113 and presents the displacement portion to the user.

With the aforementioned configuration, for example, the user can visually judge in what region sediment is deposited before and after sediment disaster. Moreover, information of the three-dimensional model can be used for, for example, estimating the amount of sediment deposited.

Moreover, for example, generating a three-dimensional model at a construction site or the like on a regular basis makes it possible to, for example, easily manage the progress of construction.

Figure 2:
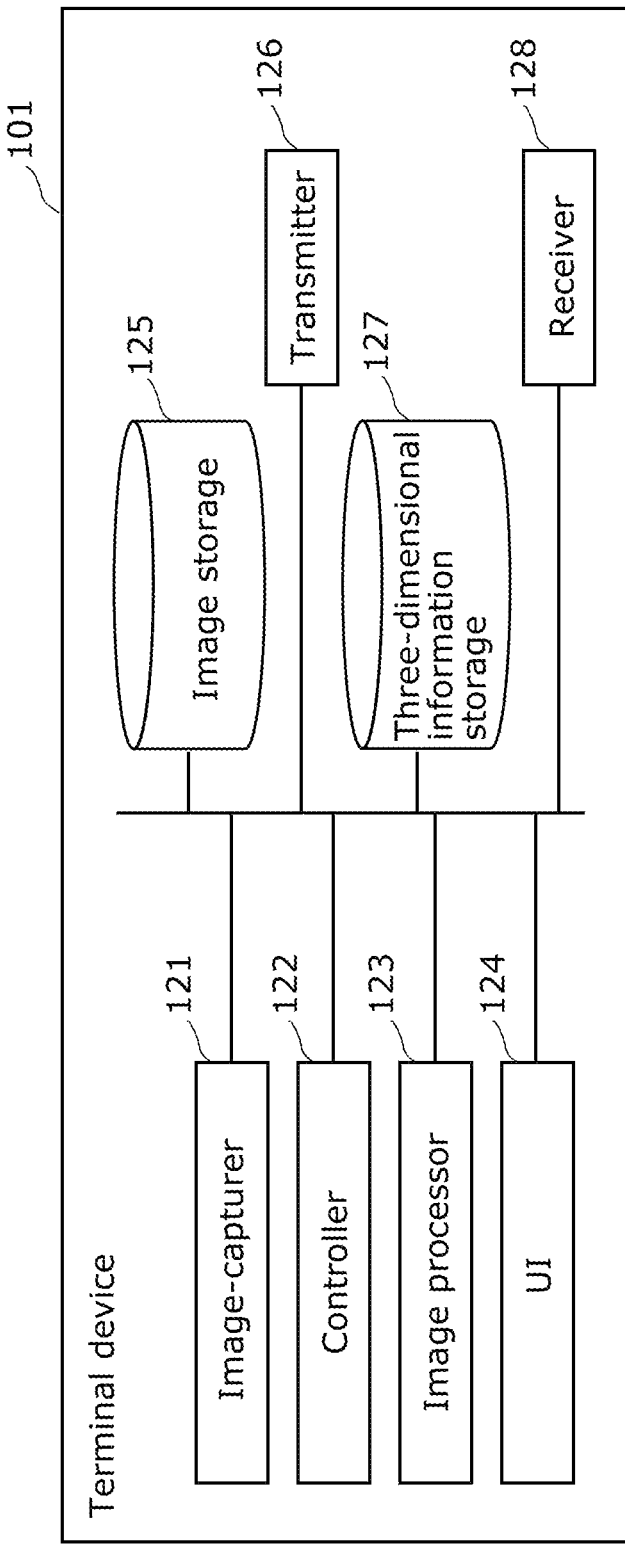
FIG. 2 is a block diagram of a terminal device according to the present embodiment.

FIG. 2 is a block diagram of terminal device 101. Terminal device 101 includes image-capturer 121; controller 122, image processor 123, UI 124, image storage 125, transmitter 126, three-dimensional information storage 127, and receiver 128.

Image-capturer 121 is, for example, an image-capturing device such as a camera, and acquires an image (still image or moving image) and saves the acquired image into image storage 125. Controller 122 controls terminal device 101.

Image processor 123 estimates the camera position and posture by use of a plurality of images saved in image storage 125. Image processor 123 also generates a three-dimensional model within an image-capturing range. Image processor 123 also saves information of the camera position and posture and the three-dimensional model to three-dimensional information storage 127. For example, image processor 123 may simultaneously perform the estimation of the camera position and posture and the generation of the three-dimensional model through image processing such as simultaneous localization and mapping (SLAM). Alternatively, when terminal device 101 has various sensors (GPS, acceleration sensor, etc.), image processor 123 may calculate the camera position and posture by use of information provided from the sensor and generate the three-dimensional model by use of structure from motion (SfM). In the former case, the processing can be performed by use of an image captured with an image-capturing device such as a camera. In the latter case, the amount of processing performed by image processor 123 can be reduced.

UI 124 acquires information of the camera position and posture and the information of the three-dimensional model from three-dimensional information storage 127 and presents the acquired information to the user. Image storage 125 stores the image captured by terminal device 101.

Transmitter 126 acquires the image from image storage 125 and transmits the acquired image to three-dimensional model processing device 102. Note that transmitter 126 may directly acquire the image from image-capturer 121 and simultaneously perform the saving of the acquired image into image storage 125 and streaming transmission.

Three-dimensional information storage 127 stores: the information of the three-dimensional position and posture of the camera (image-capturer 121) at timing at which the camera took the image; and the generated three-dimensional model. Receiver 128 receives the three-dimensional model transmitted from three-dimensional model processing device 102 and other information and passes the received three-dimensional model and information to UI 124.

Note that terminal device 101 is not required to have all the functions illustrated in FIG. 2. For example, terminal device 101 may be a terminal such as a camera which mainly has an image-capturing function including image-capturer 121, controller 122, image storage 125, and transmitter 126. Terminal device 101 may also be a terminal such as a display-only display which includes UI 124 and receiver 128.

Figure 3:
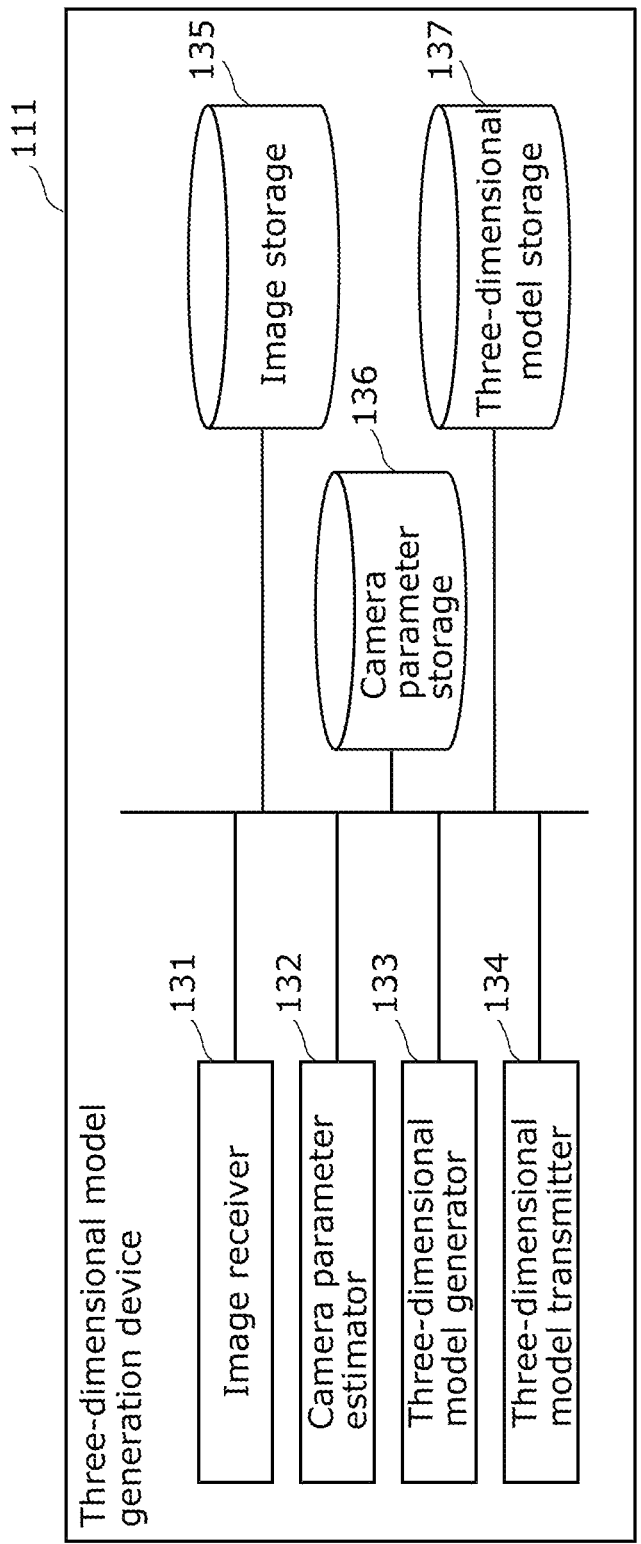
FIG. 3 is a block diagram of a three-dimensional model generation device according to the present embodiment.

FIG. 3 is a block diagram of three-dimensional model generation device 111. Three-dimensional model generation device 111 includes image receiver 131, camera parameter estimator 132, three-dimensional model generator 133, three-dimensional model transmitter 134, image storage 135, camera parameter storage 136, and three-dimensional model storage 137.

Image receiver 131 receives the image transmitted from terminal device 101 and saves the received image into image storage 135.

Camera parameter estimator 132 estimates parameters indicating the three-dimensional position and posture of the camera in each image by use of the image saved in image storage 135. Camera parameter estimator 132 saves the obtained camera parameters into camera parameter storage 136. For example, camera parameter estimator 132 performs image processing such as SLAM or SfM to thereby estimate the camera parameters. Alternatively, when terminal device 101 has various sensors (GPS and acceleration sensor) and the information obtained at the aforementioned sensors can be received from terminal device 101, camera parameter estimator 132 may calculate the camera position and posture by use of the information obtained by the sensors. Moreover, camera parameter estimator 132 may integrate the information obtained by the plurality of sensors (the camera, the GPS, the acceleration sensor, etc.) and estimate the camera parameters. For example, camera parameter estimator 132 can efficiently and accurately estimate the camera parameters by performing image processing such as SLAM by use of, as an initial value, the camera position obtained by the GPS.

Three-dimensional model generator 133 generates a three-dimensional model by use of the image acquired from image storage 135 and the camera parameters acquired from camera parameter storage 136. Three-dimensional model generator 133 saves the generated three-dimensional model into three-dimensional model storage 137. For example, three-dimensional model generator 133 generates the three-dimensional model by use of image processing such as a visual volume intersection method or a multi-view stereo (MVS). Note that three-dimensional model generator 133 may generate the three-dimensional model by use of the image and depth information obtained by a depth sensor when results of the depth sensor in addition to the image have been acquired.

Three-dimensional model transmitter 134 transmits the generated three-dimensional model to model storage 112. Three-dimensional model transmitter 134 transmits the generated three-dimensional model to terminal device 101.

Image storage 135 stores a plurality of images acquired from one or more terminal devices 101. Camera parameter storage 136 stores the respective camera parameters of the plurality of images acquired from one or more terminal devices 101. Three-dimensional model storage 137 stores the generated three-dimensional model. Note that three-dimensional model processing device 102 may not include model storage 112. In the aforementioned case, three-dimensional model generation device 111 may not include three-dimensional model storage 137.

Figure 4:
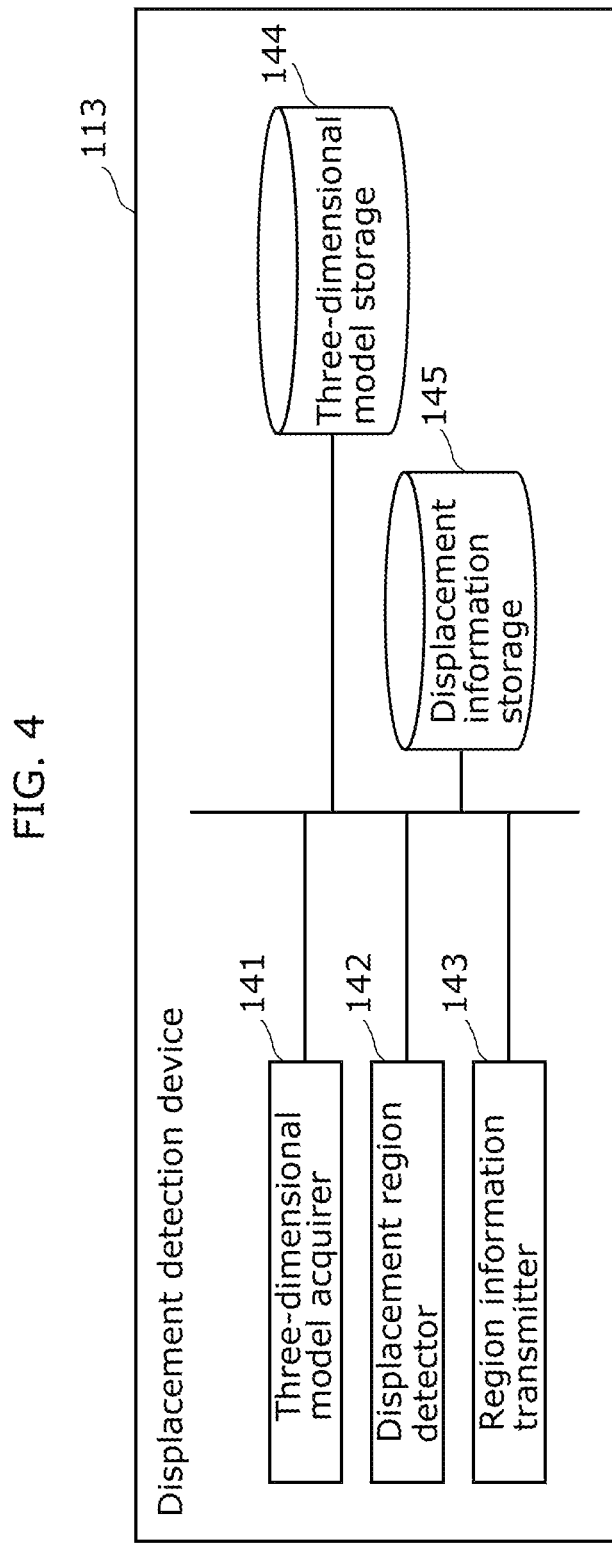
FIG. 4 is a block diagram of a displacement detection device according to the present embodiment.

FIG. 4 is a block diagram of displacement detection device 113. Displacement detection device 113 includes three-dimensional model acquirer 141, displacement region detector 142, region information transmitter 143, three-dimensional model storage 144, and displacement information storage 145.

Three-dimensional model acquirer 141 acquires a three-dimensional model from model storage 112 and saves the acquired three-dimensional model into three-dimensional model storage 144.

Displacement region detector 142 acquires two or more three-dimensional models from three-dimensional model storage 144 and detects, as displacement regions, regions different between the acquired three-dimensional models. Displacement region detector 142 saves, into displacement information storage 145, displacement region information indicating the detected displacement regions. Moreover, displacement region detector 142 carries out processing such as alignment or size adjustment when coordinate spaces of the plurality of three-dimensional models differ from each other, and detects the displacement regions by use of the three-dimensional models after the processing.

Region information transmitter 143 transmits information required for UI 114 to present the information to the user. More specifically, the aforementioned information may include: the three-dimensional model; the displacement region information; and additional information indicating, for example, the volumes of the displacement regions accompanying the displacement regions.

Three-dimensional model storage 144 stores the acquired three-dimensional model. Note that three-dimensional model processing device 102 may not include model storage 112. In the aforementioned case, displacement detection device 113 may not include three-dimensional model storage 144. Displacement information storage 145 stores three-dimensional information of the generated displacement regions and the additional information indicating, for example, the volumes of the displacement regions accompanying the displacement regions.

Figure 5:
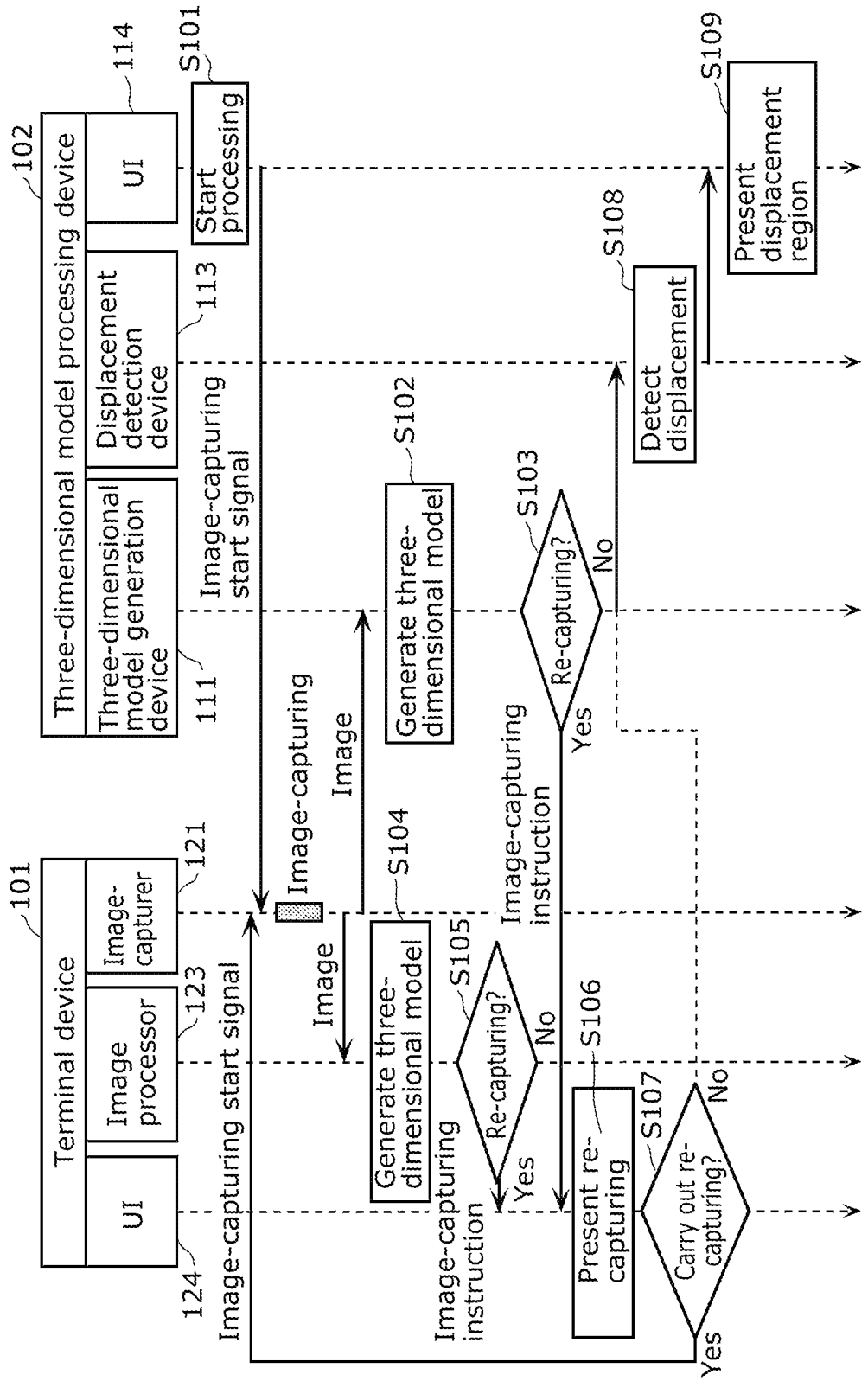
FIG. 5 is a sequence diagram of the three-dimensional model processing system according to the present embodiment.

FIG. 5 is a sequence diagram representing, for example, exchange of information in three-dimensional model processing system 100. Note that FIG. 5 illustrates an example in which one terminal device 101 is provided but a plurality of terminal devices 101 may be provided. In the aforementioned case, an image-capturing start signal after the start of processing is transmitted to the plurality of terminal devices and three-dimensional model processing device 102 performs processing by image information transmitted from the plurality of terminal devices 101.

In three-dimensional model processing system 100, three-dimensional model processing device 102 performs the processing when the user has provided an instruction. More specifically, UI 114 of three-dimensional model processing device 102 performs start processing based on the instruction provided from the user (S101). Consequently, UI 114 transmits the image-capturing start signal to terminal devices 101. For example, the start processing is performed by clicking a "Start" button displayed on a display of a personal computer (PC) by the user.

Image-capturer 121 of terminal device 101 which has received the image-capturing start signal carries out image-capturing to thereby generate an image. Moreover, terminal device 101 transmits the generated image to three-dimensional model generation device 111 and image processor 123 included in terminal device 101. For example, terminal device 101 may transmit the image simultaneously with the image-capturing as is the case with streaming transmission. Alternatively, terminal device 101 may collectively transmit the captured images after the image-capturing is stopped through operation by the user of terminal device 101. In the former case, a three-dimensional model can be generated as appropriate in three-dimensional model generation device 111, which can therefore reduce standby time for the three-dimensional model generation. In the latter case, three-dimensional model generation device 111 can utilize all the information captured and can therefore generate an accurate three-dimensional model.

Next, three-dimensional model generation device 111 generates a three-dimensional model by use of the image transmitted from terminal device 101 (S102). When the acquired image is an image generated through image-recapturing to be described later on, for example, three-dimensional model generation device 111 also generates a new three-dimensional model by use of an image newly acquired together with the image previously captured. Alternatively, three-dimensional model generation device 111 may generate a new three-dimensional model from the re-captured image and integrate the newly generated three-dimensional model with the three-dimensional model generated from the previously captured image. Three-dimensional model generation device 111 may dispose the three-dimensional model generated from the previously captured image and newly generate a three-dimensional model from the re-captured image.

Next, three-dimensional model generation device 111 analyzes whether the three-dimensional model generated in S102 has any missing or sparse portion and determines whether or not image-recapturing is required (S103). For example, three-dimensional model generation device 111 determines whether or not the deviation of the density of three-dimensional points in each object included in the three-dimensional model is greater than a predefined threshold value, and when the deviation of the density is greater than the threshold value, three-dimensional model generation device 111 determines that image-recapturing is required. Three-dimensional model generation device 111 may also present the three-dimensional model to user and determine whether or not image-recapturing is required based on a user operation.

Subsequently, image processor 123 of terminal device 101 generates a three-dimensional model by use of the image captured by terminal device 101 (S104). For example, image processor 123 generates a three-dimensional model which is sparser than the three-dimensional model generated in S102 in order to suppress a processing amount. Note that when terminal device 101 has sufficiently high processing capability, image processor 123 may generate a three-dimensional model at the same level as that of the three-dimensional model generated in S102. When the re-captured image has also been acquired in S104 as is the case with S102, image processor 123 may not use the image captured previously and the three-dimensional model generated previously.

Next, image processor 123 analyzes whether or not there is any missing or sparse portion in the three-dimensional model generated in S104 and determines whether or not image-recapturing is required (S105). For example, image processor 123 performs the determination based on the deviation of the density of the three-dimensional points as is the case with S103. Alternatively, terminal device 101 may present the three-dimensional model to the user and perform the determination based on a user operation.

Upon determination in S103 or S105 that image-recapturing is required (YES in S103 or S105), UI 124 presents the user that image-recapturing is required (S106). For example, UI 124 presents information that image-recapturing is required. Alternatively, when the sparse portion has already been identified through the analysis, UI 124 may indicate the sparse region on the generated three-dimensional model and also present the image-recapturing. Moreover, when the user has performed the determination in S103, three-dimensional model processing device 102 may transmit information specifying the image-recapturing position, and UI 124 may present the image-recapturing position to the user who uses terminal device 101.

Upon determination in S105 or S103 that image-recapturing is to be carried out (Yes in S107), UI 124 sends an image-capturing start instruction to image-capturer 121. Then image-capturer 121 which has received the image-capturing start instruction carries out image-capturing. Note that the user who uses terminal device 101 or three-dimensional model processing device 102 may determine in S107 whether or not image-recapturing is required.

On the other hand, when recapturing is not to be performed (No in S107), three-dimensional model processing device 102 transits to the processing sequence after the three-dimensional model generation. First, displacement detection device 113 acquires the three-dimensional model generated in S102 and the three-dimensional model of the same region and obtained at another time and saved in model storage 112 and estimates displacement regions as regions where displacement between the acquired three-dimensional models occurs (S108).

Finally, UI 114 presents the displacement regions of the three-dimensional model estimated in S108 and accompanying information thereof to the user (S109). Note that three-dimensional model processing device 102 may transmit the displacement regions and the accompanying information to terminal device 101, and terminal device 101 may present the received displacement regions and accompanying information thereof to the user via UI 124.

Figure 6:
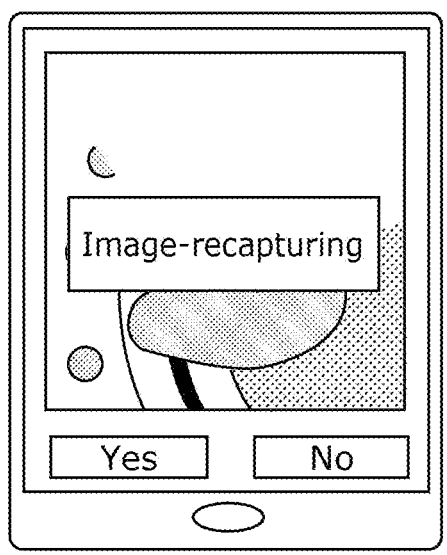
FIG. 6 is a diagram illustrating one example of image-recapturing presentation according to the present embodiment.
Figure 7:
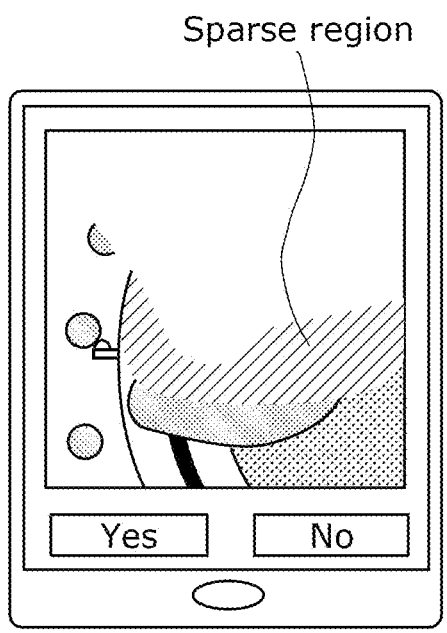
FIG. 7 is a diagram illustrating one example of the image-recapturing presentation according to the present embodiment.
Figure 8:
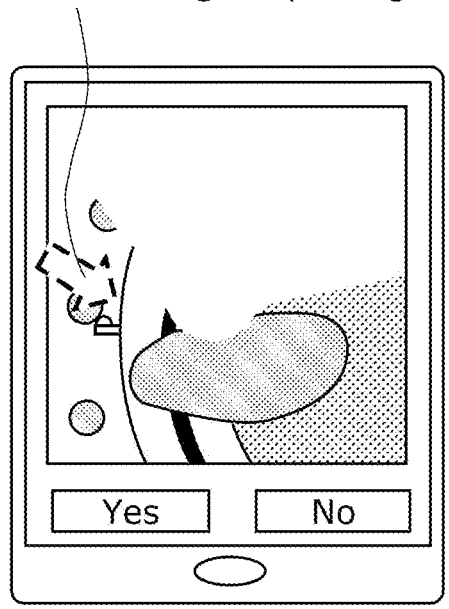
FIG. 8 is a diagram illustrating one example of the image-recapturing presentation according to the present embodiment.

FIGS. 6 to 10 are schematic diagrams each illustrating one example of the image-recapturing presentation (S106). Displayed in the example illustrated in FIG. 6 is a bird's-eye view of the generated three-dimensional model, where the image-recapturing instruction is displayed. Illustrated in the example of FIG. 7 is a sparse region in the bird's-eye view of the generated three-dimensional model. Illustrating in the example of FIG. 8 is a bird's-eye view and a recommended image-capturing direction of the generated three-dimensional model.

Moreover, an operation region for the user to operate whether or not to perform image-recapturing (option of Yes and No) is displayed in a lower region of a display in FIGS. 6 to 10. Note that an interface for a user operation is not limited to the aforementioned one and any interface is permitted which enables the user to specify whether or not to perform image-recapturing.

Moreover, image-recapturing is presented through the display on each terminal device 101 here, but a display only terminal device may be prepared. For example, the display only terminal device includes a large display such as an electric bulletin board and performs display on the aforementioned display. Consequently, the collective presentation to a plurality of users can be performed at once. Consequently, a recommended image-capturing direction or image-capturing portion can be notified to the user even when terminal device 101 is a camera which has only a small display, which therefore makes it possible to carry out efficient image-capturing.

Figure 9:
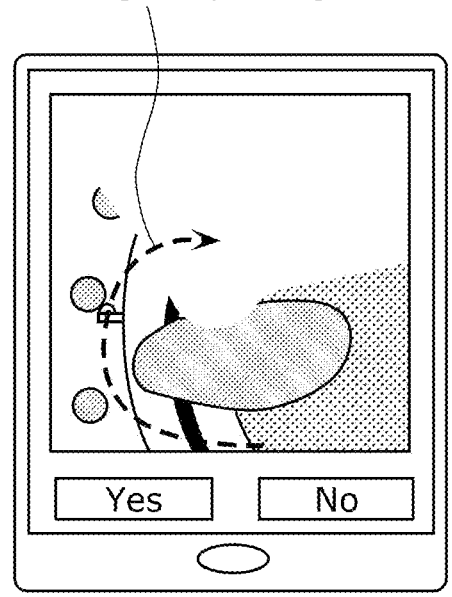
FIG. 9 is a diagram illustrating one example of the image-recapturing presentation according to the present embodiment.

In the example illustrated in FIG. 9, the bird's-eye view of the generated three-dimensional model is displayed and a recommended route which has been estimated to achieve the efficient generation of the three-dimensional model is presented. For example, the user performs the capturing of a moving image or the capturing of a plurality of still images by terminal device 101 while moving on the recommended route.

Figure 10:
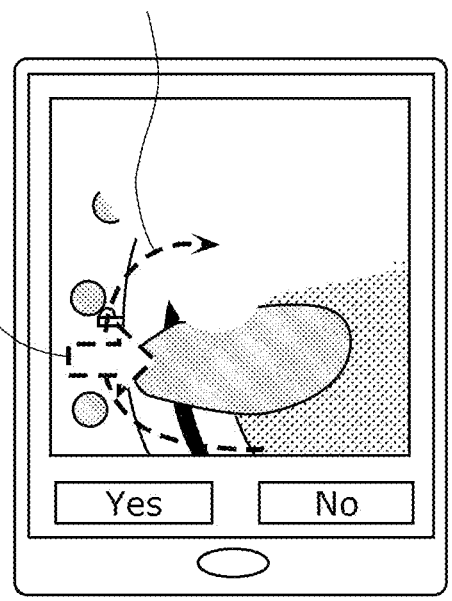
FIG. 10 is a diagram illustrating one example of the image-recapturing presentation according to the present embodiment.

Displayed in the example illustrated in FIG. 10 is a bird's-eye view of the generated three-dimensional model, and the recommended route and the image-capturing direction which have been estimated to achieve the efficient generation of the three-dimensional model are presented. Note that the image-capturing direction at each of a plurality of sites on the recommended route may be presented. Alternatively, based on the position information of terminal device 101, the image-capturing direction at the site where terminal device 101 is present may be presented.

Note that terminal device 101 may sequentially estimate the camera position and posture at image processor 123, and when the obtained results differ from the recommended image-capturing route and image-capturing direction by given values or more, terminal device 101 may notify the differences to the user. Consequently, it is possible to stably realize appropriate image-capturing regardless of user capability.

Moreover, three-dimensional model processing device 102 may sequentially estimate the camera position and posture of terminal device 101 and, when the obtained results differ from the recommended image-capturing route and the recommended image-capturing posture of terminal device 101 by the given values or more, three-dimensional model processing device 102 may notify the differences to the user. For example, three-dimensional model processing device 102 may provide the aforementioned notification to terminal device 101 by transmission means such as a mail or may use such a method that presents the position of one or more terminal devices 101 on a large display or the like so that a plurality of users can simultaneously confirm the position.

Figure 11:
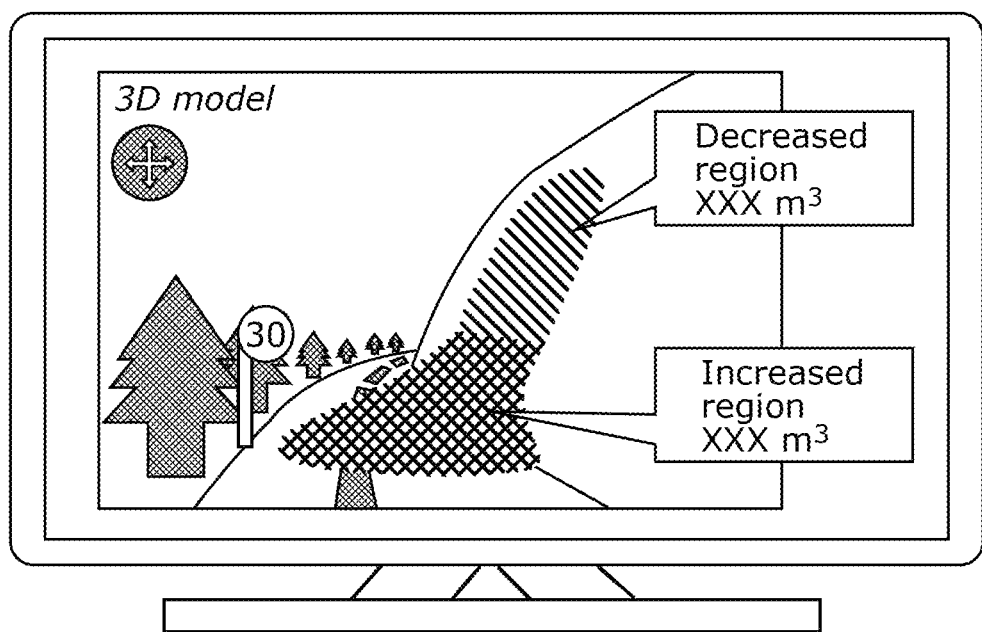
FIG. 11 is diagram illustrating one example of displacement region presentation according to the present embodiment.

FIG. 11 is a schematic diagram illustrating one example of the displacement region presentation (S108). For example, UI 114 of three-dimensional model processing device 102 includes a display. The aforementioned display displays: the generated three-dimensional model as the three-dimensional model which has been generated; an increased region and a decreased region as regions increased and decreased from a reference three-dimensional model as a reference in the generated three-dimensional model; and estimated volume values of the increased region and decreased region. FIG. 11 illustrates an example assuming the estimation of the amount of sediment in landslide environment.

The reference three-dimensional model here is a three-dimensional model generated from an image or the like obtained by previously capturing the same range. In the aforementioned example, a slope where the landslide has occurred is represented as the decreased region and crumbling sediment is represented as the increased area.

Figure 12:
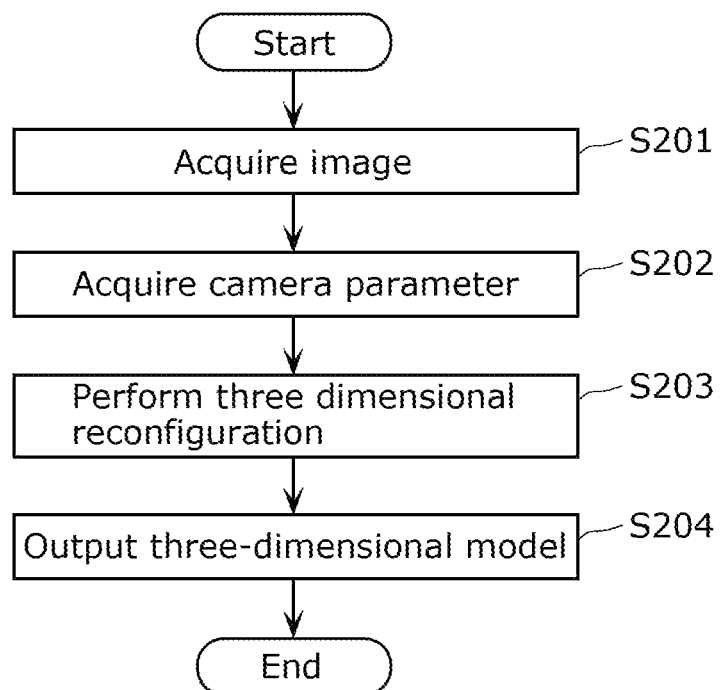
FIG. 12 is a flowchart of three-dimensional model generation processing according to the present embodiment.

FIG. 12 is a flowchart of the three-dimensional model generation processing (S102) performed by three-dimensional model generator 133 included in three-dimensional model generation device 111. First, three-dimensional model generator 133 acquires a plurality of images from image storage 135 (S201).

Next, three-dimensional model generator 133 acquires camera parameters including the three-dimensional position, orientation, and lens information of the camera for the plurality of images (S202). For example, three-dimensional model generator 133 carries out image processing such as SLAM or SfM on the images acquired in S201 to thereby acquire the camera parameters. Note that for example, when the camera position is fixed, the camera parameters may be previously stored in camera parameter storage 136 and three-dimensional model generator 133 may acquire the camera parameters stored in camera parameter storage 136.

Next, three-dimensional model generator 133 performs three-dimensional reconfiguration processing of generating a three-dimensional model by use of the images acquired in S201 and the camera parameters acquired in S202 (S203). Processing such as, for example, a visual volume intersection method or SfM can be used as the processing.

Finally, three-dimensional model generator 133 stores the three-dimensional model generated in S203 into three-dimensional model storage 137 (S204).

Note that three-dimensional model generator 133 may read an image sequence for all times in S201 and may perform post-stage processing (S202 to S204) on the images for all the times. Alternatively, three-dimensional model generator 133 may sequentially acquire the images in a streaming manner in S201 and repeatedly carry out the post-stage processing (S202 to S204) on the acquired images. In the former case, the accuracy can be more improved as a result of using the information for all the times. In the latter case, the sequential processing can be performed, which can ensure an input delay of a fixed length and can reduce standby time required for generating the three-dimensional model.

Moreover, three-dimensional model generator 133 may start the three-dimensional reconfiguration processing (S203) after the completion of the camera parameter acquisition processing (S202) or may parallelly perform the processing by starting the processing using the acquired camera parameters at a time point at which the camera parameters of part of the cameras have been acquired.

With the aforementioned configuration, in the former case, when the camera parameters are estimated through the image processing, overall optimization can be carried out to thereby estimate more accurate camera parameters. In the latter case, the processing can be sequentially carried out, which can shorten the processing time required for generating the three-dimensional model.

Note that the flow of the processing performed in S102 also applies to three-dimensional model generation processing (S104) performed by image processor 123 included in terminal device 101. Moreover, terminal device 101 and three-dimensional model generation device 111 may not perform completely the same processing. For example, the processing amount of the processing performed in terminal device 101 may be smaller than the processing amount of the processing performed in three-dimensional model generation device 111. Moreover, the processing performed in three-dimensional model generation device 111 may be capable of generating a more accurate three-dimensional model than the processing performed in terminal device 101.

Figure 13:
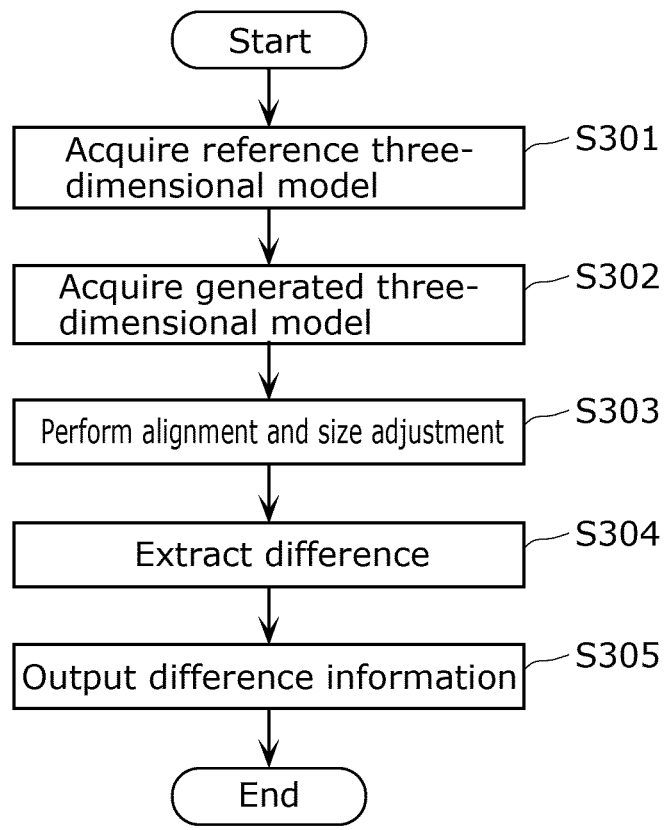
FIG. 13 is a flowchart of displacement detection processing according to the present embodiment.

FIG. 13 is a flowchart of the displacement detection processing (S108). First, displacement detection device 113 acquires a reference three-dimensional model (S301). Next, displacement detection device 113 acquires the generated three-dimensional model (S302). Note that a sequence of S301 and S302 may be reversed.

Next, displacement detection device 113 performs processing (alignment and size adjustment) of adjusting coordinate spaces of the reference three-dimensional model acquired in S301 and the generated three-dimensional model acquired in S302 (S303).

Next, displacement detection device 113 extracts a difference between the two three-dimensional models whose coordinate spaces have been adjusted in S303 to thereby extract a region where the generated three-dimensional model has increased or decreased from the reference three-dimensional model (S304).

Next, displacement detection device 113 generates information indicating the region extracted in S304 and information related to the aforementioned region and outputs the generated information (difference information) (S305). For example, the information related to the region includes information of, for example, the volume and the color of the region.

Note that at least one of the reference three-dimensional model and the generated three-dimensional model is only required to have a correct size-related scale value in the alignment and size adjustment performed in S303. For example, the reference three-dimensional model and the generated three-dimensional model are generated in different devices or times. When the reference three-dimensional model has low reliability on the scale, displacement detection device 113 can adjust the sizes of the two three-dimensional models with reference to the generated three-dimensional model to thereby acquire a correct scale.

Note that when correct scale values cannot be ensured for the two, displacement detection device 113 may recognize an object of a known size and adjust the scales of the two three-dimensional models with the scale of the aforementioned object to thereby estimate or correct the scale values. For example, displacement detection device 113 may correct the scale values of the three-dimensional models based on the size of an object such as a road sign or a traffic light whose standards have been determined.

Figure 14:
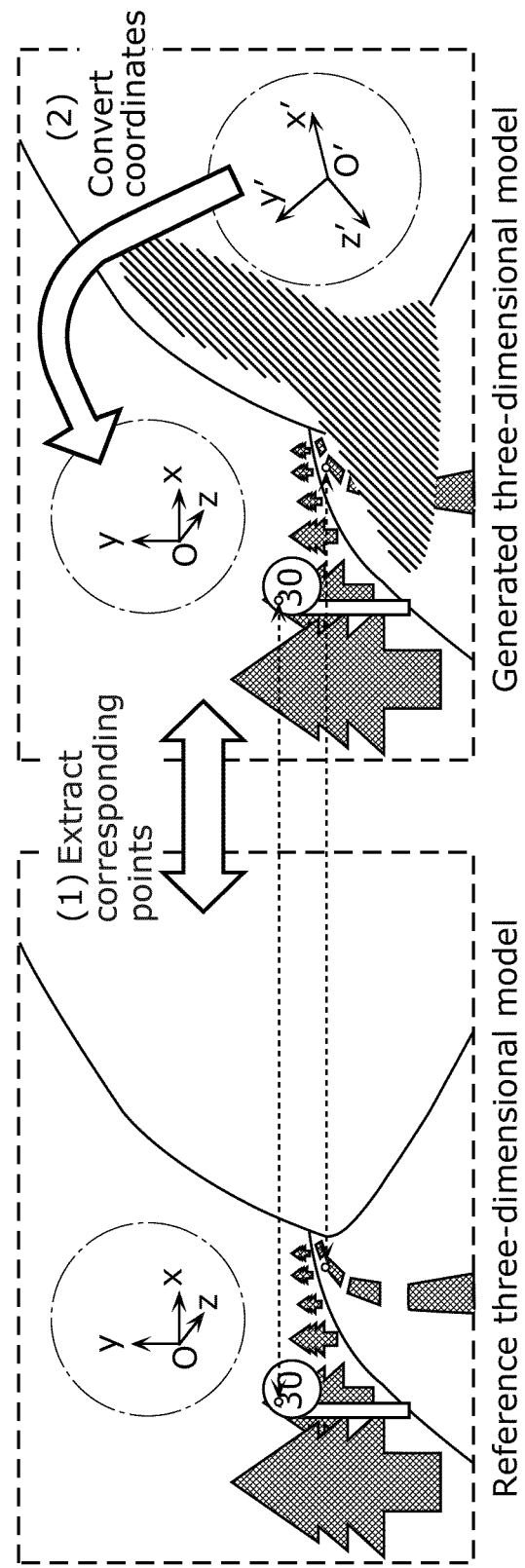
FIG. 14 is a diagram illustrating one example of alignment and size adjustment processing according to the present embodiment.

FIG. 14 is a diagram schematically illustrating one example of the alignment and size adjustment processing (S304). Displacement detection device 113 repeatedly performs two steps of extraction and coordinate conversion of corresponding points as three-dimensional points corresponding to the reference three-dimensional model and the generated three-dimensional model in the alignment processing.

Displacement detection device 113 extracts corresponding points indicating the same object for the reference three-dimensional model and the generated three-dimensional model in the corresponding point extraction processing. For example, as illustrated in FIG. 14, a point of a number on a sign or a point of a corner of a white line on a road is used as the corresponding points. At this point, displacement detection device 113 extracts the corresponding points from not a natural object such as vegetation and rocks but a rigid artificial object such as a sign and a bridge. Consequently, points with little temporal displacement can be used as the corresponding points. As described above, displacement detection device 113 may preferentially select points included in a high-quality artificial object as the corresponding points.

For example, displacement detection device 113 may perform object recognition by use of the three-dimensional points included in the three-dimensional model to thereby generate attribute information such as the sign and the bridge. Alternatively, displacement detection device 113 may perform the object recognition by use of an image to thereby generate attribute information and then project the generated attribute information on the three-dimensional model by use of camera geometry to thereby generate attribute information of the object included in the three-dimensional model.

Moreover, in the coordinate conversion, displacement detection device 113 calculates a conversion matrix for converting coordinate axes (x', y', and z') of the generated three-dimensional model into coordinate axes (x, y, and z) of the reference three-dimensional model so as to reduce a distance between the plurality of corresponding points extracted in the corresponding point extraction processing, and performs coordinate conversion by use of the calculated conversion matrix. Note that when there are N sets of corresponding points, displacement detection device 113 may extract M (N>M) sets of corresponding points from the N sets of corresponding points, calculate a conversion matrix by use of the M sets of corresponding points, and repeatedly perform the processing so as to minimize the distance between the remaining (N-M) sets of corresponding points. Consequently, displacement detection device 113 can derive an accurate conversion matrix.

Figure 15:
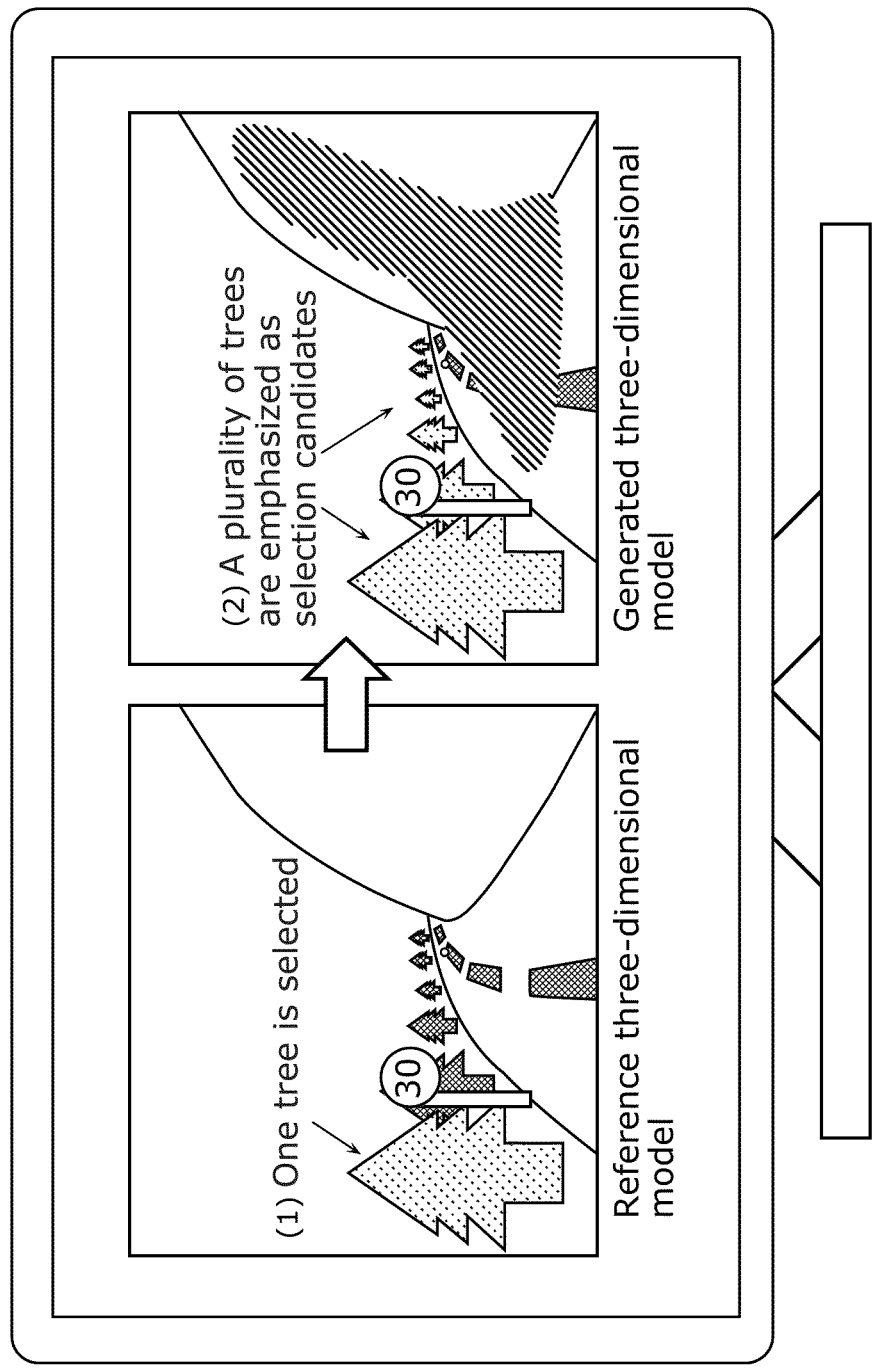
FIG. 15 is a diagram illustrating a display example of a user interface according to the present embodiment.

Moreover, displacement detection device 113 may present, to the user, a user interface using the attribute information of the object in the corresponding point extraction processing. FIG. 15 is a diagram illustrating a display example of the user interface.

For example, as illustrated in FIG. 15, one tree in the reference three-dimensional model is selected by the user. In the aforementioned case, displacement detection device 113 displays a plurality of trees in the generated three-dimensional model as selection candidates in an emphasized manner. The user selects, from among the plurality of trees displayed in the generated three-dimensional model in the emphasized manner, the tree corresponding to the selected tree in the reference three-dimensional model.

Note that FIG. 15 illustrates an example in which the selected object (tree) is emphasized as an example of the emphasized display, but the objects other than the selected object may be blurred to be displayed to relatively emphasize the selected object. For example, the objects other than the selected object may be displayed semi-transparently.

Moreover, displacement detection device 113 may not only display the selected object in an emphasized manner but also may turn the selected object into a selectable state and turn the objects other than the selected object into a non-selectable state.

Moreover, the example in which the object (one tree) is selected has been described here, but a portion or a point (for example, the tip of the tree) in the object may be selected. Illustrated here is an example in which the object in the reference three-dimensional model is selected and the object in the generated three-dimensional model corresponding to the selected object is selected, but the object in the generated three-dimensional model may be selected and the object in the reference three-dimensional model corresponding to the selected object may be selected.

Note that the selected object is not limited to a tree. That is, displacement detection device 113 may display the object having the same attributes as the attributes of the selected object in an emphasized manner.

Moreover, illustrated here is the example in which the corresponding point selection is made by the user, but part of the aforementioned processing may be automatically performed by displacement detection device 113. For example, displacement detection device 113 may perform at least one of the processing of selecting the object in the reference three-dimensional model and the processing of selecting the object in the generated three-dimensional model corresponding to the selected object. Upon performing the processing of selecting the object in the generated three-dimensional model corresponding to the selected object, for example, displacement detection device 113 performs search for corresponding objects (corresponding points) while narrowing down a range of search for the object having the same attributes as the attributes of the selected object.

Moreover, the attribute information may have a hierarchical structure. For example, as there may exist natural objects and artificial objects as top classification and there may exist trees, rocks, etc., as subclassification (fine classification) of the natural object. Note that the classification may include two or more hierarchies. In the aforementioned case, displacement detection device 113 may, for example, first narrow down the range of the display or search by use of the lower attributes and then when there exists no corresponding point therein, narrows down the range of the display or search by use of the top classification.

Alternatively, displacement detection device 113 may change the degree of the emphasized display and whether or not the selection is permitted in accordance with the hierarchy. For example, when the selected object is a tree, displacement detection device 113 may display the tree in an emphasized manner, normally display natural objects other than the tree, and display the objects other than those described above in a blurred manner. Moreover, displacement detection device 113 may set the tree and the natural objects other than the tree to be selectable and set the objects other than those described above to be non-selectable.

As described above, the three-dimensional model processing system according to one aspect of the present disclosure can provide a system which can acquire, with a mobile camera, difference information of the same subject at different times in the three-dimensional model generation using a camera image. Moreover, the extraction of changed portions in three-dimensional information such as progress management at construction sites or the estimation of sediment amount in sediment-related disasters can be realized in environment where a fixed camera cannot be installed.

Figure 16:
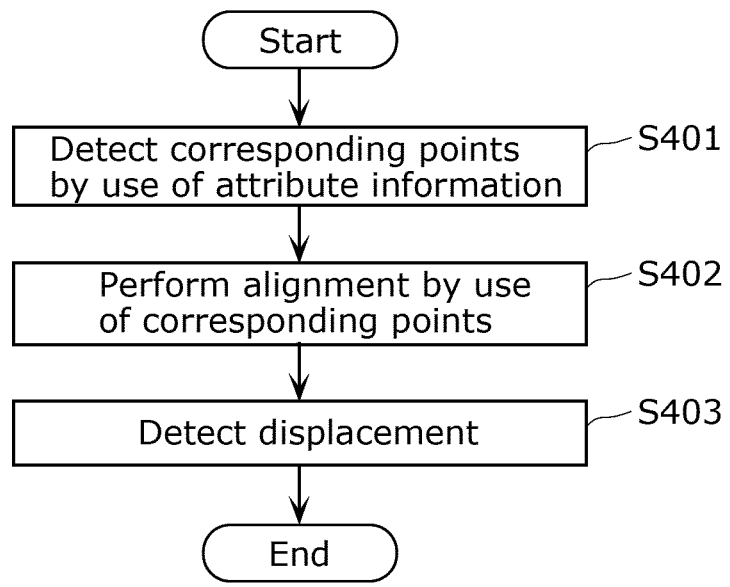
FIG. 16 is a flowchart of the displacement detection processing according to the present embodiment.

As described above, the displacement detection device according to the present embodiment performs the processing illustrated in FIG. 16. The displacement detection device detects displacement between the first three-dimensional model (for example, reference three-dimensional model) and the second three-dimensional model (for example, generated three-dimensional model) of the same region and obtained at mutually different times. First, the displacement detection device detects the corresponding points included in the first three-dimensional model and the second three-dimensional model by use of attribute information of first objects included in the first three-dimensional model and second objects included in the second three-dimensional model (S401).

Next, the displacement detection device performs alignment (including coordinate conversion and size adjustment) between the first three-dimensional model and the second three-dimensional model by use of the detected corresponding points (S402). Next, the displacement detection device detects displacement (a difference) between the first three-dimensional model and the second three-dimensional model after the alignment (S403).

With the aforementioned configuration, the displacement detection device can detect the corresponding points by use of the attribute information to thereby improve the displacement detection accuracy.

For example, in the corresponding point detection (S401), the displacement detection device detects the corresponding points by preferentially using artificial objects included in the first objects and the second objects based on the attribute information. For example, preferentially using refers to using the artificial objects included in the objects. Alternatively, preferentially using refers to detecting the corresponding points by use of the artificial objects included in the objects, and refers to detecting the corresponding points by use of the objects other than the artificial objects when the corresponding points cannot be detected or when the number of corresponding points detected is small.

With the aforementioned configuration, the displacement detection device can perform the alignment by use of the corresponding points included in the artificial objects with less temporal change than natural objects to thereby improve the alignment accuracy. Therefore, the displacement detection device can improve the displacement detection accuracy.

For example, in the corresponding point detection (S401), the displacement detection device selects a first selected object from among the first objects, selects a second selected object having the same attribute information as the attribute information of the first selected object from among the second objects, and detects corresponding points by use of the first selected object and the second selected object based on a user operation.

With the aforementioned configuration, the displacement detection device can detect the corresponding points from the objects having the same attribute information to thereby improve the corresponding point detection accuracy. Therefore, the displacement detection device can improve the alignment accuracy and can improve the displacement detection accuracy.

For example, as illustrated in FIG. 15, the displacement detection device displays a user interface for a user to select the second selected object from among the second objects and then selects the second selected object from among the second objects based on a user operation through the user interface in the selection of the second selected object. With the user interface, of the second objects, only the second objects having the same attribute information as the attribute information of the first selected object are selectable.

With the aforementioned configuration, the displacement detection device can improve the accuracy in the corresponding point detection performed by the user. Therefore, the displacement detection device can improve the alignment accuracy and can improve the displacement detection accuracy.

For example, with the user interface, of the second objects, the second objects having the same attribute information as the attribute information of the first selected object are emphasized than the second objects having the attribute information different from the attribute information of the first selected object.

With the aforementioned configuration, the displacement detection device can improve the accuracy in the corresponding point detection performed by the user. Therefore, the displacement detection device can improve the alignment accuracy and can improve the displacement detection accuracy.

For example, the displacement detection device includes a processor and a memory and the processor performs the aforementioned processing by use of the memory.

Figure 17:
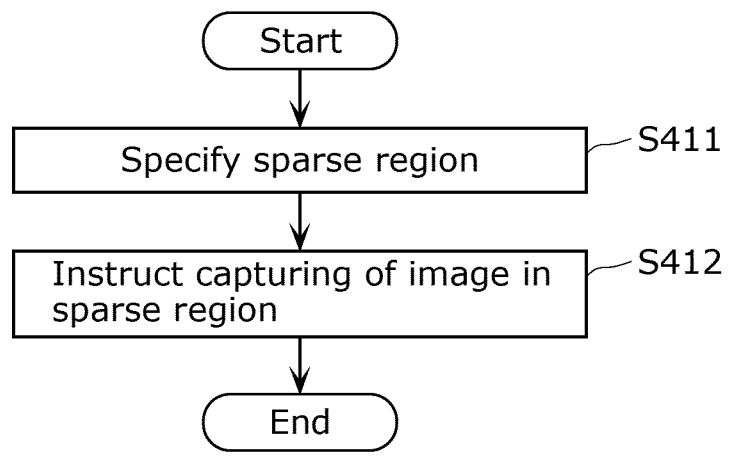
FIG. 17 is a flowchart of image-capturing instruction processing according to the present embodiment.

Moreover, the image-capturing instruction device according to the present embodiment performs processing illustrated in FIG. 17. The image-capturing instruction device here is, for example, terminal device 101 or three-dimensional model generation device 111.

The image-capturing instruction device instructs image-capturing using three-dimensional model generation. First, the image-capturing instruction device specifies a region of the generated three-dimensional model where points are sparse (S411). The generated three-dimensional model here refers to, for example, a three-dimensional model which has been generated by use of a images captured in the past.

Next, the image-capturing instruction device instructs the user to capture an image in the specified region (S412). For example, the image captured here and the image captured in the past are used to generate a new three-dimensional model (or update the three-dimensional model).

With the aforementioned configuration, the image-capturing instruction device can improve the accuracy of the three-dimensional model by use of the captured images. Therefore, the image-capturing instruction device can improve the displacement detection accuracy.

For example, as illustrated in FIG. 9, the image-capturing instruction device instructs, to the user, a route on which the image in the specified region is captured in the instruction (S412). With the aforementioned configuration, for example, the image-capturing instruction device can collectively instruct the capturing of still images or moving images using the three-dimensional model generation.

For example, as illustrated in FIG. 9, the image-capturing instruction device displays the route on a bird's-eye view of the three-dimensional model in the instruction (S412). With the aforementioned configuration, the image-capturing instruction device can appropriately instruct the user.

For example, as illustrated in FIG. 10, the image-capturing instruction device displays, on the bird's-eye view, an image-capturing direction at an image-capturing point in the route in the instruction (S412). With the aforementioned configuration, the image-capturing instruction device can appropriately instruct the user.

For example, the image-capturing instruction device includes the processor and the memory and the processor performs the aforementioned processing by use of the memory.

The displacement detection device, the image-capturing instruction device, etc. according to the embodiment of the present disclosure have been described above, but the present disclosure is not limited to the aforementioned embodiment.

The processing parts included in the displacement detection device, the image-capturing instruction device, etc. according to the aforementioned embodiment are each typically realized as an LSI serving as an integrated circuit. The processing parts may be individually chipped or may be integrated into one chip so as to include part or all thereof.

The integrated circuit is not limited to the LSI and may also by realized by a dedicated circuit or a general-purpose processor. Also permitted for use is a field programmable gate array (FPGA) which is capable of programming after LSI production or a reconfigurable processor which is capable of reconfiguring the connection or setting of circuit cells inside the LSI.

In the embodiment described above, each of the components may be configured by dedicated hardware or may be realized by executing a software program suitable for each component. Each component may be realized by reading and executing the software program recorded on a recording medium such as a hard disc or a semiconductor memory by a program execution part such as a CPU or a processor.

The present disclosure may be realized by the displacement detection method, the image-capturing instruction method, etc. executed by the displacement detection device, the image-capturing instruction device, etc.

Functional block division in the block diagram is one example and a plurality of functional blocks may be realized as one functional block, and one functional block may be divided into a plurality of blocks or part of the function may be transferred to a different functional block. Moreover, the functions of the plurality of functional blocks having similar functions may be processed in parallel or in time division manner by a single hardware or software.

The execution sequence of the steps in the flowchart is illustrated for a detailed description of the present disclosure and a sequence other than the aforementioned sequence may be provided. Part of the aforementioned steps may be executed simultaneously (parallelly) with the other steps.

A displacement detection device, an image-capturing instruction device, etc., according to one or more aspects have been described above based on an embodiment, but the present disclosure is not limited to the aforementioned embodiment. Forms obtained by various modifications to the present embodiment which can be conceived by those skilled in the art, and forms obtained by combining components in different embodiments, so long as they do not depart from the spirit of the present disclosure, may be included in the scope of the one or more aspects.

INDUSTRIAL APPLICABILITY

The present disclosure is applicable to a displacement detection device and an image-capturing instruction device.

The invention claimed is:

1. An image-capturing instruction method comprising:
   specifying a region of a first three-dimensional model where points are sparse, the first three-dimensional model being generated by using a captured first image; and
   displaying, on a display, a route for a user to travel along to capture a second image in the region specified, the second image being for use in generating a second three-dimensional model, wherein
   movement of the user instructed with the route includes movement in a direction other than an image depth direction.

2. The image-capturing instruction method according to claim 1, wherein
   the displaying includes displaying the route on a bird's-eye view of the three-dimensional model.

3. The image-capturing instruction method according to claim 2, wherein
   the displaying includes displaying an image-capturing direction at an image-capturing point in the route on the bird's-eye view.

4. An image-capturing instruction method comprising:
   specifying a region of a first three-dimensional model where image-recapturing is required, the first three-dimensional model being generated by using a captured first image; and
   displaying, on a display, a route for a user to travel along to capture a second image in the region specified, the second image being for use in generating a second three-dimensional model, wherein
   movement of the user instructed with the route includes movement in a direction other than an image depth direction.

5. An image-capturing instruction device comprising:
   a processor; and
   a memory, wherein
   the processor, by use of the memory:
   specifies a region of a first three-dimensional model where points are sparse, the first three-dimensional model being generated by using a captured first image; and displays, on a display, a route for a user to travel along to capture a second image in the region specified, the second image being for use in generating a second three-dimensional model, wherein movement of the user instructed with the route includes movement in a direction other than an image depth direction.

6. An image-capturing instruction device comprising:

a processor; and a memory, wherein the processor, by use of the memory:

specifies a region of a first three-dimensional model where image-recapturing is required, the first three-dimensional model being generated by using a captured first image; and displays, on a display, a route for a user to travel along to capture a second image in the region specified, the second image being for use in generating a second three-dimensional model, wherein movement of the user instructed with the route includes movement in a direction other than an image depth direction.

\* \* \* \* \*